(12) United States Patent
Weintraub

(10) Patent No.: US 10,777,088 B2
(45) Date of Patent: Sep. 15, 2020

(54) METHOD AND APPARATUS FOR THE DEVELOPMENT OF COMPETENCY BASED EDUCATIONAL COURSES AND CURRICULUM

(71) Applicant: Philip Weintraub, Jupiter, FL (US)

(72) Inventor: Philip Weintraub, Jupiter, FL (US)

(73) Assignee: DESIGNYOURCOURSE.COM, LLC, Jupiter, FL (US)

( * ) Notice: Subject to any disclaimer, the term of this patent is extended or adjusted under 35 U.S.C. 154(b) by 517 days.

(21) Appl. No.: 14/632,805

(22) Filed: Feb. 26, 2015

(65) Prior Publication Data

US 2016/0071425 A1 Mar. 10, 2016

Related U.S. Application Data

(60) Provisional application No. 62/046,194, filed on Sep. 5, 2014.

(51) Int. Cl.
*G09B 7/00* (2006.01)
*G09B 19/00* (2006.01)

(52) U.S. Cl.
CPC ............... *G09B 7/00* (2013.01); *G09B 19/00* (2013.01)

(58) Field of Classification Search
USPC ........................................................ 434/350
See application file for complete search history.

(56) References Cited

U.S. PATENT DOCUMENTS

2012/0072261 A1    3/2012   Oberoi et al.

*Primary Examiner* — James B Hull
(74) *Attorney, Agent, or Firm* — Insigne LLP

(57) ABSTRACT

A method and apparatus for the development of educational courses and curriculum using a secure web based server computer platform and software application that aligns course outcomes and course learning objectives with core and specialized course competencies and uniquely develops course summary and compliance reports that may be used for course approval and accreditation of an educational institution. The course development software program provides a course syllabus that includes presentation summaries, textbook, video, test and other materials and assignments for a teacher to easily organize and present daily activities for the classroom.

10 Claims, 20 Drawing Sheets

Design Your Course
jamtak.com/design-your-course/professor-portal/step6.php

7. Module Design
8. COLO Compliance Report™
9. Download Your Syllabus

Course Outcomes — 173
— 177

Discuss major psychological, social, and behavioral factors influencing public health.

Describe major social/behavioral science theories used to inform public health practice.

Describe, and discuss evidence supporting the use of behavioral/social science theory in public health.

Apply behavioral/social science theories applicable to the design and implantation of public health interventions for different populations and problems.

Explain ethical and legal principles in the practice of public health interventions.

Identify a social ecological framework regarding how individual, community, and population health is affected by factors at multiple levels.

Examine and critique important theoretical framework for understanding social and behavioral health interventions.

Examine specific public health intervention strategies.

Identify the role of race, class, ethnicity, gender, religion and culture.

Explain how health-related behavior reflects culture differences in conceptualizations of health and illness and show how these patterns vary across time and place.

Examine and critique important theoretical framework for understanding social and behavioral health interventions.

Identify the contributions of various research approaches in understanding and addressing levels of public health problems related to social and behavioral factors.

Discuss the importance of effective communication in health promotion interventions that address social and behavioral aspects of global health.

Explain the importance of "culture competence" in working with diverse communities to effect change in social and behavioral factors related to the health of individuals and communities. communities. related to the health of individuals and Explain how social and behavioral sciences are important to public health domestically and abroad and complement and approaches used in other major public health disciplines.

Your Curriculum / Our Technology

<< Back to Dashboard

1. Course Name
2. Course Competencies
3. Specialization Competencies
4. Course Outcomes
5. Learning Objectives
6. COLO Summary Report™
7. Module Design
8. COLO Compliance Report™
9. Download Your Syllabus COLO Compliance Report™

University Name and logo     Social Sciences

Instructor and Course Lecturer
Ace Lim
Philip

Proposed Finance Textbooks:
Text Books

Course Competencies and Learning Objectives:

Core Competencies:
Identify basic theories, concepts and models from a range of social and behavioral disciplines that are used in public health research and practice.
Identify the causes of social and behavioral factors that affect health of individuals and populations.
Specialization Competency:

Learning Objectives:
Explain the role of social and behavioral factors as major determinants of morbidity and mortalit
Describe the role of social and behavioral interventions to reduce public health problems and e
improve the health of individuals and populations.
Identify the principles and concepts of health behavior theories and models that are used in public health research and practice.
Identify steps and procedures of planing social and behavioral interventions and policies.

Download COLO Compliance Report™

METHOD AND APPARATUS FOR THE DEVELOPMENT OF COMPETENCY BASED EDUCATIONAL COURSES AND CURRICULUM

RELATED APPLICATION

This application claims the benefit of pending U.S. Provisional Patent Application No. 62/046,194 filed Sep. 5, 2014 entitled METHOD AND APPARATUS FOR THE DEVELOPMENT OF COMPETENCY BASED EDUCATIONAL COURSES AND CURRICULUM which is hereby incorporated herein by reference in its entirety.

FIELD OF THE INVENTION

The present invention is a method and apparatus for the development of educational courses and curriculum using a secure web based server computer platform and software application that aligns course outcomes and course learning objectives with core and specialized course competencies and uniquely develops course summary and compliance reports that may be used for course approval and accreditation of any type of educational institution or training within an organization. The course development software program further provides a course syllabus that includes presentation summaries, textbook information, video, test and other course materials and assignments for a teacher to easily organize and present daily activities for the classroom.

BACKGROUND OF THE INVENTION

For the majority of universities and colleges in the United States, educational course development remains a challenging, expensive and time-consuming process often requiring repetitive hands-on involvement by college professors, department chairs, deans, and administrators. Only a fortunate number of educational institutions can afford to have specialized in-house curriculum development groups work with college professors and handle much of the development process. Certain large universities and colleges are engaging outside organizations to provide developed courses of instruction principally for large audience on-line programs at the graduate and undergraduate levels further removing oversight and approval from the universities administration. This situation is similar at lower grade levels where teachers in public and private schools with limited time and resources may preferably repeat lessons year after year with only minor modifications rather than put the time and substantial effort required in to develop new course materials and curriculums. As educational mandates are enforced and financial challenges are faced at all academic levels, it is more and more critical that an institution's educational administration can monitor and approve course development activities to assure alignment with competency requirements to maintain and achieve competitive advantages over other institutions.

Currently in developing a course, the professor or other educator is given the core and specialization competency requirements developed for the course by the educational institution and must use this information to develop the course content and the syllabus to coherently structure the material within the available calendar days when the course will be presented. While some educational institutions may provide technical assistance from professional instructional designers, software technicians, and/or IT specialists, the duties of these individuals may principally involve advising on technical issues and placing the completed course on the school's learning management system platform, leaving the college professor with the onerous process of considering how to create and/or supplement the course content with additional material to meet the core and specialization competencies.

The professor must create course outcomes and learning objectives to align with the competencies which in some cases means the professor must develop entirely new course content or extensively update existing course content to meet these requirements. They must then divide the course content into classes with specific topics which align with the school calendar, and the core competencies, specialization competencies, course outcomes and learning objectives leading to the goal of developing the course syllabus. At any point in time, if the educational institution and/or the professor changes any core or specialization competency, any course outcome, any learning objective, any class topic or any date when the class will be offered, the professor must make the required amendments and update any portions of the course documents that are effected by the amendments. He must then go back to the beginning and carefully step through and re-read the course documents to determine whether the course competencies continue to align with the course outcomes and learning objectives, class topics and dates. At various points in the process the professor may submit the course for review to their department chair, dean, associate dean and/or others which may require repeated back and forth steps of review to reach approval. If changes are required, the professor is again required to review how each change impacts the course competencies within each part of the course. Additionally, the current curriculum development process may also necessitate that the college professor have a high level of computer skills including, but not limited to: experience with the full Microsoft Office Suite of applications; specialized software applications involving audio/video production; and ultimately an understanding of issues with the integration of the course with the educational institution's learning management system.

While appropriate course development is critical for an educational institution to demonstrate with evidence that it meets the requirements of accreditation, the process of substantiating this can be a huge task for an educator with each professor required to substantiate and document their course work in order to provide the necessary work product for the accreditation process. This evidence must include an assessment that a course can articulate the purposes, content and intended learning outcomes of its competency requirements. The criteria for accreditation include any number of factors, and must primarily show there is a focus on student learning and that learning objectives are met. The software application of the present invention provides a secure web environment that efficiently makes each professor or educator an accomplished competency based course developer, capable of developing a course that will meet the demands of accrediting agencies as if each school had their own specialized in house or out-sourced course development group.

SUMMARY OF THE INVENTION

The method and apparatus of the present invention is for the development of educational courses and curriculum using a course development software application implemented on a secure web based server computer platform. The course development software application of the present invention provides for an educator at any grade level to structure course content and materials with core and specialized course competency requirements and to integrate and align these competencies with course outcomes and learning objectives. From this integration and alignment of course competencies, outcomes and learning objectives, the course development software application uniquely develops course summary and compliance reports that may be used for the accreditation of an educational institution. The software application and computer platform may be referred to herein as DesignYourCourse.com™ which is a user-friendly step by step software application that may be used by college professors, department chairs, instructional designers, high school and grade school teachers, administrators, and other training organizations to assist in developing and delivering consistent, high quality, competency-based student curriculum. The secure accessibility of the DesignYourCourse.com™ web portal allows these stakeholders to collaborate and comment on the course development process in real time saving time and money. Whether the course of instruction is delivered in the traditional classroom, a blended class (i.e., a traditional classroom and a web-based on-line class) or be accessible only as a web-based on-line class, the DesignYourCourse.com™ software application of the present invention meets the curriculum development needs of any type of educational institution and provides educators with the ability to develop courses that meet the highest standards of accreditation. Specialized computer skills are not required to consistently and efficiently prepare course syllabuses which are aligned with the educational institution's core and specialized competencies. The course syllabus may list lectures and presentations that may be accessible live or as video through an intranet or internet connection. The syllabus may also list the required textbooks and course materials, and allow students to purchase these materials through an online shopping portal. The course development software application also seamlessly integrates the course information with the educational institute's learning management system platform to post and have the course syllabus accessible to any number of students.

The software application and computer platform further provides an inventory of competencies, outcomes and learning objectives for a wide variety of courses in a multitude of subjects, to save time and allow an educator to easily find and review specific course requirements and focus their expertise on structuring and presenting course materials that enrich the student's learning experience. These competencies, outcomes and learning objectives may be easily updated based on the requirements of a particular institution, government bureaucracy, or curriculum. The course development software application further creates reports that are referred to herein as COLO Summary Reports™ and COLO Compliance Reports™ that are prepared in conjunction with the course syllabus. These reports support the educational institution's accreditation process by demonstrating clear alignment between the course core and specialized competencies, outcomes and learning objectives and the individual class learning objectives and topics.

It is an object of the software application and computer platform of the present invention that one or more secure domains are developed for each educational institution with customizable features to display logos and insignia from the institution and to provide secure access at different administrative levels for course development and review.

It is a further object of the software application of the present invention that secure personal profiles for each user within an educational institution is provided with personal preferences, storage and secure accessibility to restrict and prevent unauthorized access as determined through preset administrative tools.

It is a further object of the software application of the present invention that course information may be edited and transportable using a modular format that provides for any portion of the content, the presentation day, assignments, course materials, course outcomes, course learning objectives, core and specialized course competencies, and other content and features to be easily modified and moved as necessary within a development module design interface.

It is another object of the software application of the present invention that course information, the course syllabus, lectures, presentations, textbooks and course materials from the software application computer platform of the present invention be integrated with an educational institution's learning management system platform to be accessible to faculty, administrators, students and others.

It is another object of the software application of the present invention to generate reports that support the educational institution in the accreditation process.

It is another object of the software application that access and use requires minimal computer skills for the creation of courses and the modification of content with use of features of the software application being intuitive and easy.

It is another object of the software application that a module design interface provides for portions of the software to be modified while alignment and associations of modules with content and competencies remain intact.

It is another object of the invention that an inventory of competencies, outcomes and learning objectives for a wide variety of courses in a multitude of subjects is available to educators to assist in course development and the accreditation process.

It is another object of the invention that content of the inventory of competencies, outcomes and learning objectives is updated in a secure manner as required.

The present invention is related to a competency based educational course development system implemented as a software application on a computer system, comprising a course development software application implemented on a computer system, the computer system having computer hardware, system memory, at least one database, data storage and communications interfaces that facilitate the transformation of data using the course development software application; the course development software application comprising a course information module, a course competencies module; and wherein the course development software application transforms transactional data entered into the course information module to integrate the course information transactional data with transactional data entered into the course competencies module to develop competency based educational courses.

The course competencies module of the competency based educational course development system implemented as a software application on a computer system may have a specialization competencies module, a course outcomes module, and/or a learning objectives module. The course competencies module may comprise an inventory of core and specialization competencies, outcomes and learning objectives for a wide variety of courses in a multitude of subjects. The competency based educational course development system may comprise a comprehensive summary report module that transforms and integrates transactional data from the course development software application to develop a summary report for accreditation of an educational institution. The competency based educational course development system may comprise a comprehensive compliance report module that transforms and integrates transactional data from the course development software application to develop a compliance report for accreditation of an educational institution. The competency based educational course development system implemented as a software application on a computer system may comprise a module design interface that transforms, integrates and modularizes transactional data from the course development software application to develop, display, and modify a course syllabus. The course development software application may transform transactional data to integrate the course information and course syllabus with a learning management system of an educational institution. The competency based educational course development system may comprise administrative tools to restrict features and access to users based on authorization, appropriate logins, and passwords and may comprise a web based server computer system for implementation of the course development system through an internet or local area network connection. A unique domain for each implementation of the course development system through the web based server computer system may be provided.

The present invention is also related to a method for the development of competency based educational courses using a course development system implemented as a software application on a computer system, comprising the steps of implementing a course development software application on a computer system having computer hardware, system memory, at least one database, data storage and communications interfaces; constructing the course development software application with a course information module and a course competencies module; entering data into the course information module; entering data into the course competencies module; and transforming the data entered into the course information module to integrate the course information transactional data with transactional data entered into the course competencies module to develop competency based educational courses.

The method for the development of competency based educational courses may comprise the step of integrating the course information transactional data with specialized competencies data, with course outcomes data, and/or with learning objectives data entered in the course competencies module. The method for the development of competency based educational courses may comprise the step of constructing the course competencies module with an inventory of competencies, outcomes, and learning objectives for a wide variety of courses in a multitude of subjects; and storing the inventory within at least one database of a computer system.

The method for the development of competency based educational courses may comprise the steps of transforming and integrating transactional data from the course development software application to develop a summary report and/or to develop a compliance report for accreditation of an educational institution. The method for the development of competency based educational courses using a course development system implemented as a software application on a computer system may comprise the steps of transforming, integrating and modularizing the transactional data to develop, display, and modify a course syllabus. The method for the development of competency based educational courses using a course development system may transform transactional data to integrate the course information and course syllabus with a learning management system of an educational institution.

The method for the development of competency based educational courses using a course development system implemented as a software application on a computer system may comprise the step of accessing the course development software application through a web based server computer system using an internet or local area network connection and the configuring of the course development system through the web based server computer system with a unique domain for each educational institution.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which:

FIG. 6 is a representation of a personalized profile page in an embodiment of the course development software application of the present invention;

FIG. 7 is a representation of a course information module in an embodiment of the course development software application of the present invention;

FIG. 8 is a representation of a course information module showing course professors in an embodiment of the course development software application of the present invention;

FIG. 17 is a representation of course outcomes provided in an embodiment of a COLO Summary Report™ in an embodiment of the course development software application of the present invention;

FIG. 18 is a representation of modular design interface for developing and modifying a course syllabus in an embodiment of the course development software application of the present invention;

FIG. 19 is a representation of an embodiment of a COLO Compliance Report™ Module in an embodiment of the course development software application of the present invention; and FIG. 20 is a representation of Course Syllabus Download Module in an embodiment of the course development software application of the present invention.

DETAILED DESCRIPTION OF THE INVENTION

Figure 1:
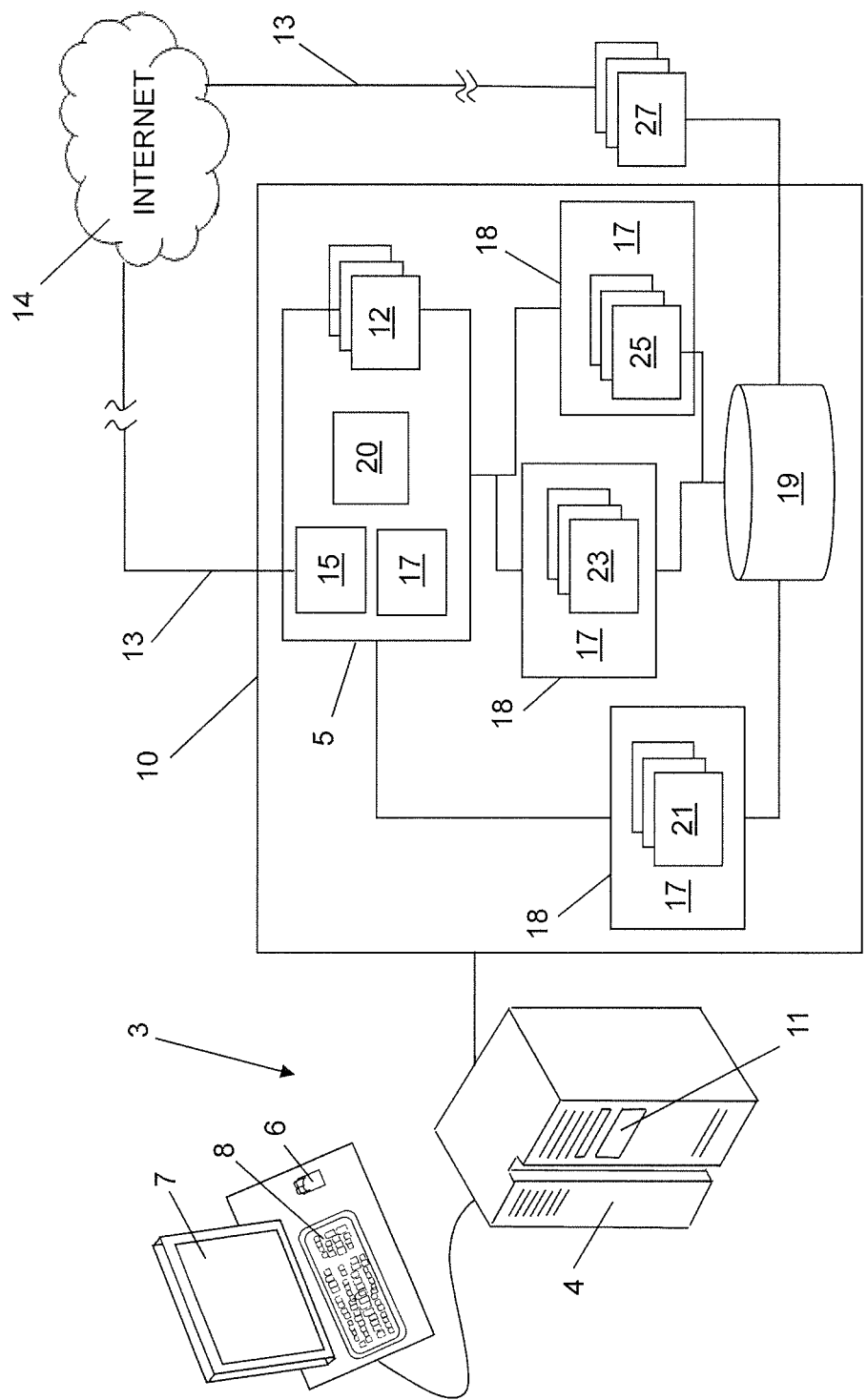
FIG. 1 is a diagrammatic representation of a server computer system in an embodiment of the course development software application of the present invention.

As shown in FIG. 1, there is illustrated a computer system 3 for deploying the present invention. Although the computer system 3 is shown for the purpose of illustrating an embodiment, the present invention is not limited to the computer system 3 shown, but may be used with any electronic processing system such as found in digital communications devices, cellular phones and other mobile devices, home computers, laptop computers, tablet computers, or any other system for the processing of digital data. The computer system 3 includes a server computer 4 having a microprocessor-based unit 5 (also referred to herein as a processor) for receiving and processing software programs and for performing other processing functions. An output device 7 such as a visual display is electrically connected to the microprocessor-based unit 5 for displaying user-related information associated with the software, e.g., by means of a graphical user interface. A keyboard 8 is also connected to the microprocessor-based unit 5 for permitting a user to input information to a software program. As an alternative or in addition to using the keyboard 8 for input, a mouse 6 may be used for moving a selector on the display 7 or alternatively a touch screen or other input device may be provided for selecting an item and operation of the software application.

The output device 7 provides visually to the user transactional data that has been subject to transformations using the course development software application of the present invention implemented on a computer system 3. The output device 7 can be a monitor, a tablet computer, or other visual computer screen or graphical user interface (GUI) a printer or other digital device that provides a visual or other type representation of a final output from the microprocessor-based unit 5. The output device 7 can also be an output device that provides the transactional data as a digital file. The microprocessor-based unit 5 provides means for processing the transactional data to produce readily discernible, informational and organized images and data on the intended output device 7 or media. The present invention can be used with a variety of other output devices that can include, but are not limited to, a digital photographic printer and soft copy display. Those skilled in the art will recognize that the present invention is not limited to just these mentioned data processing functions. The server computer 4 shown in FIG. 1 can store computer programs by having a program stored in an internal or external computer readable storage medium 11, which may include, for example: magnetic storage media such as a magnetic disk or magnetic tape; optical storage media such as an optical disc, optical tape, or machine readable bar code; solid state electronic storage devices such as random access memory (RAM), read only memory (ROM) or flash memory or other data storage devices. The associated computer programs may be stored locally and or remotely on a virtual machine (VM) or data center using any other physical device or medium employed to store a computer program indicated by offline memory device. For example, the method can be performed using a system including one or more digital communications devices and/or one or more personal computer systems. The digital devices may be connected wirelessly, using WiFi, Bluetooth, cellular or other radio-frequency links, and it is to be appreciated that such devices can be mobile devices (e.g., iPod, iPad, tablet computer, notebook, laptop, smart phone, or cell phone that can be used as a processing unit, a display unit, and/or a unit to give processing instructions), and as a service offered through a network connection 13 via the internet 14.

The course development software application 10 may be built using a combination of HTML, CSS, Java Script, JQuery, and PHP or other software languages where those skilled in the art will readily recognize that the equivalent of such software may also be constructed in computer, electrical and communications hardware. The course development software application 10 may have a communications interface 15, code related to the software application 17 and administrative tools 20. The communications interface 15 may be an email server to transmit messages and notifications to users of the course development software application 10. The administrative tools 20 set and prioritize access and features to users based on requirements of use. Data records 12 such as an inventory of competencies, outcomes and learning objectives for a wide variety of courses in a multitude of subjects may be accessible to some or all users as determined by course requirements and administrative access established for each user. Because data manipulation algorithms and systems are well known, the present description emphasizes algorithms and features forming part of, or cooperating more directly with the method and hardware of the presently disclosed invention. General features of databases, digital communications devices, email and computerized systems are likewise well known, and the present description is generally limited to those aspects directly related to the method and related hardware of the invention. Other aspects of such algorithms and apparatus, and hardware and/or software for producing and otherwise processing the data involved therewith, not specifically shown or described herein may be selected from such systems, algorithms, components, and elements known in the art.

Implementation of the course development software application 10 may be in conjunction with one or more database management systems (DBMS) 19 such as Oracle, IBM DB2, Microsoft SQL Server, PostageSQL, MySQL, or others using widely supported database languages such as SQL to define and manipulate data and perform data queries. Other aspects of such algorithms and apparatus, and hardware and/or software for producing and otherwise processing the data involved therewith, not specifically shown or described herein may be selected from any such systems, algorithms, components, and elements known in the art. The software application and computer platform may be hosted on a SSL, SSL 256, SHTTP bit secured server as a fully redundant data center. The platform may have multiple levels of security and layers of redundancy built in to make sure that all data and personal information is secured and not open to the public. Data replication and redundancy may be performed automatically and all servers may be secured in optimal conditions. The implementation may further provide synchronization of local and remote desktop clients using virtual machine check in and check out operations to maintain access to the most recently updated local or remote copies that reflect user changes to software programs and accessed data files.

In each context, the invention may stand alone or may be a component of a larger system solution. Furthermore, human interfaces, e.g., the input, the digital processing, the display to a user, the input of user requests or processing instructions, the output, can each be on the same or different devices and physical locations, and communication between the devices and locations can be via public or private network connections, or media based communication. Where consistent with the foregoing disclosure of the present invention, aspects of the method of the invention can be fully automatic, may have user input (be fully or partially manual), may have user or operator review to accept/reject the result, or may be assisted by data or metadata (data or metadata that may be user supplied, supplied by another computer program or database from a different application or determined by an algorithm). Moreover, the algorithm(s) may interface with a variety of workflow user interface schemes.

The course development software application 10 of the present invention may be implemented through the application software 17 downloaded to the server 4 and/or as a web-native software application delivery model or SaaS (Software as a Service) to be hosted and operated as an on demand computing service such as a cloud or shared resource database through a web browser using the internet 14 through an internet connection 13. The course development software application 10 may include policies and protocols in cloud description language (CDL) and domain specific languages (DSL) for this implementation to manage and monitor secure access and system usage to one or more domains to provide multiple virtual servers 18 with each server serving one or more instantiations of the course development software application 10. Security of the virtual server 18 is provided by having a separate virtual server 18 setup for each educational institution 24 using a unique domain name that may be active solely during the period of course development, and may be immediately deactivated upon completion or at any time. Each virtual server 18 has data storage where unique data records 21, 23 and 25 specific to the educational institution 24 are secured. External data 27 including competencies, outcomes and learning objectives developed by the educational institution 24 and/or from government and educational organizations and agencies may be available through a network and/or internet connection 13. At all times, the educational institution's transactional data and course content is protected from unauthorized access and copying through the secure management protocols of the course development software application 10. At completion, access to the course development software application 10 may be inactivated and the entire database with all data may be ported to a storage unit and be provided to the educational institution 24 as a secure record of all processing steps, communications and transactional data of the course curriculum development.

Figure 2:
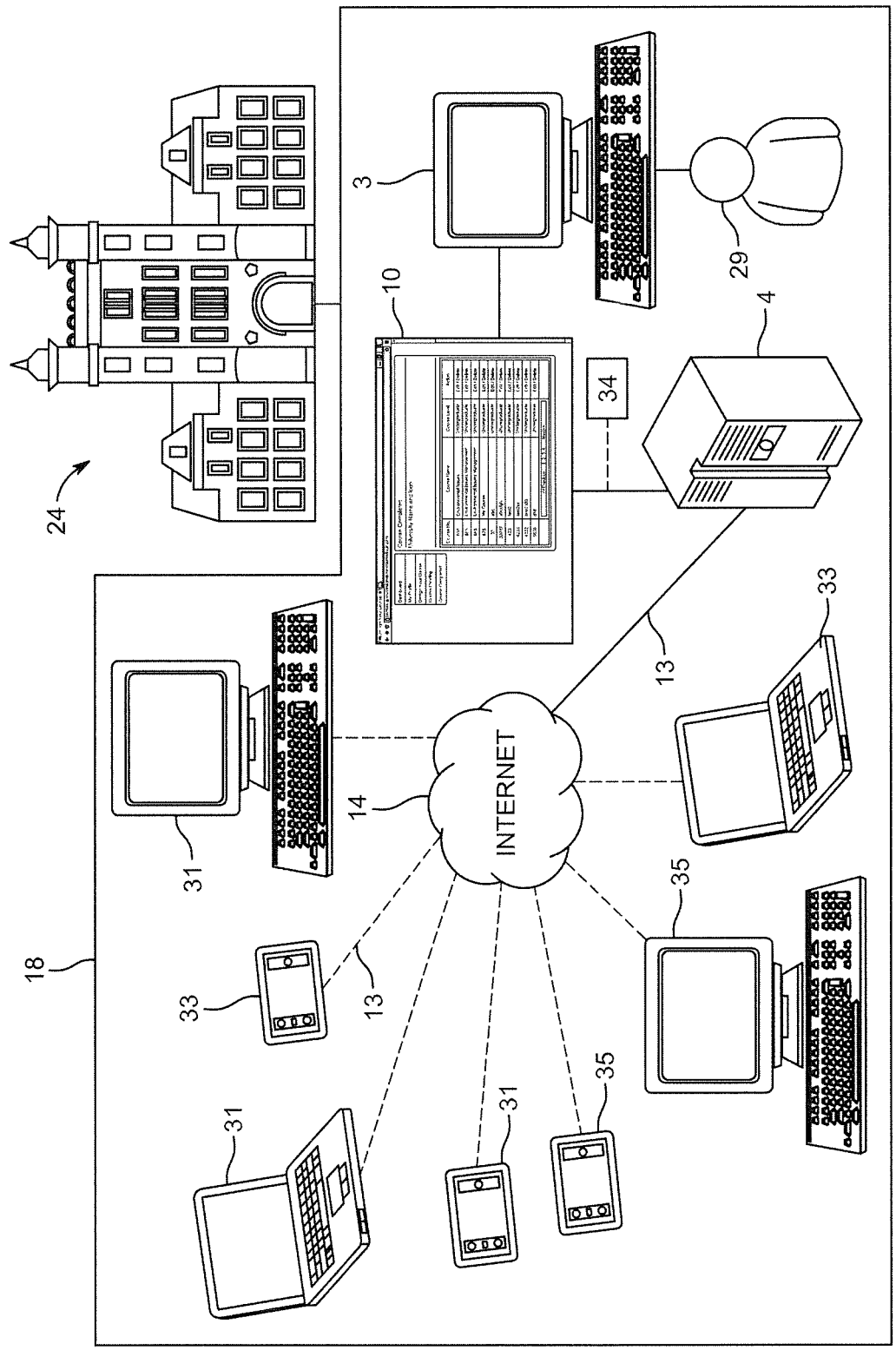
FIG. 2 is a diagrammatic representation of an embodiment of a web based server computer platform using an intranet or internet network system in an embodiment of the course development software application of the present invention.

Users of the course development software application 10 associated with an educational institution 24 will access the secure virtual server 18 using a unique domain name and then enter a secure login name and password which provides access at different administrative levels based on their use. As shown in FIG. 2, the users may be educators 31 such as college professors that access the virtual server 18 through their desktop, laptop, or tablet computer systems. The users may also be institutional administrators 33 such as department chairs or deans that may access the course development software application 10 virtual server 18 to review and approve course content and the alignment of content with competency requirements and objectives. Other users may be students 35 that access the course syllabus and course materials and may purchase textbooks through the virtual server 18 that may be integrated with the educational institution's learning management system 34 or may provide links to external websites for downloads of material or purchases. Each user is granted appropriate access to the secure project specific domain of the virtual server 18 through an administrator 29 using administrative tools 20 to control the levels of access so as to prevent or limit access to the course development software application 10 through pre-defined privileges based on responsibility and usage. The administrator 29 also monitors performance of the course development software application 10 and assists with training and operation of the site as needed.

Figure 3:
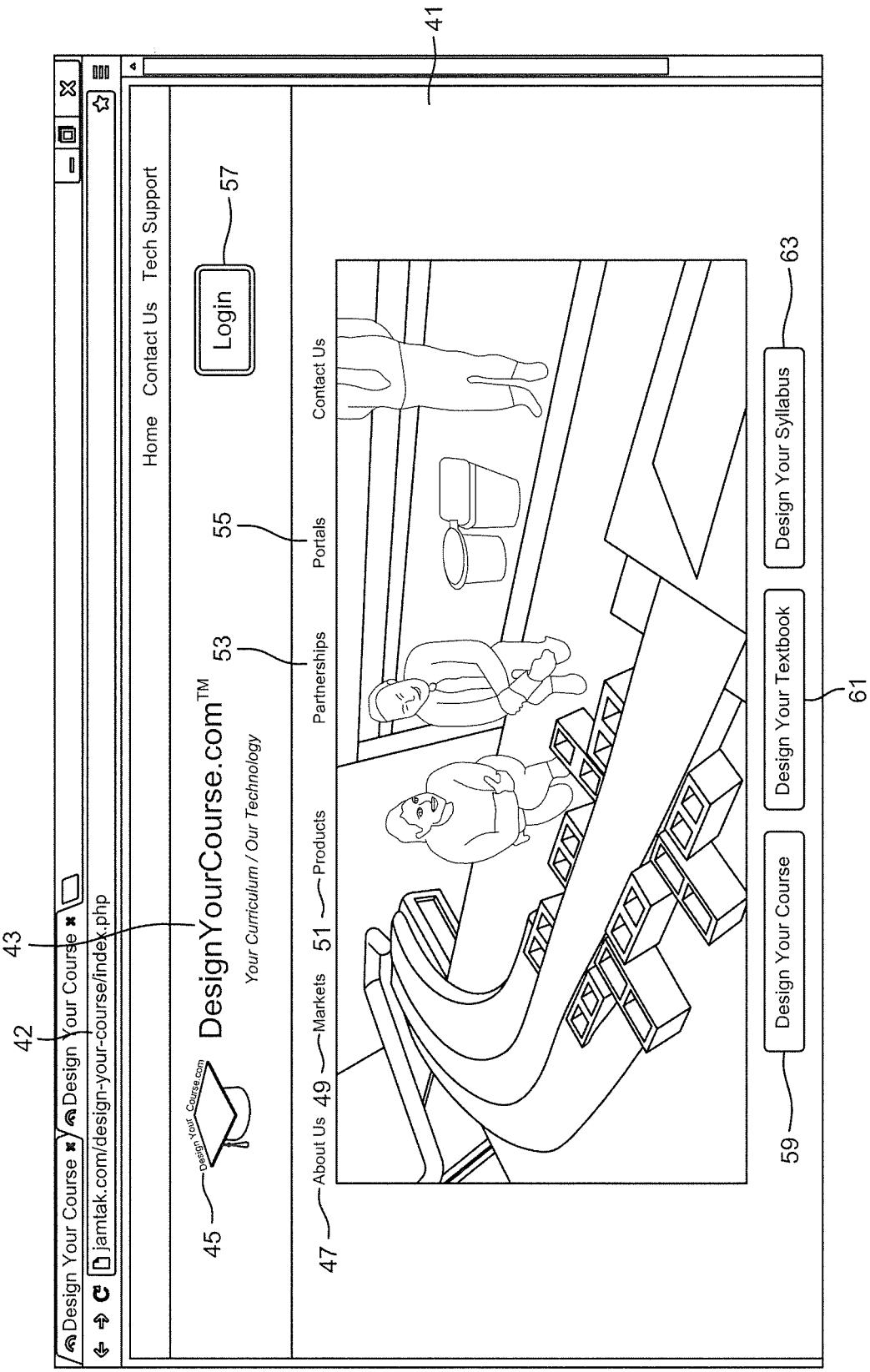
FIG. 3 is a representation of a home page in an embodiment of the course development software application of the present invention.
Figure 4:
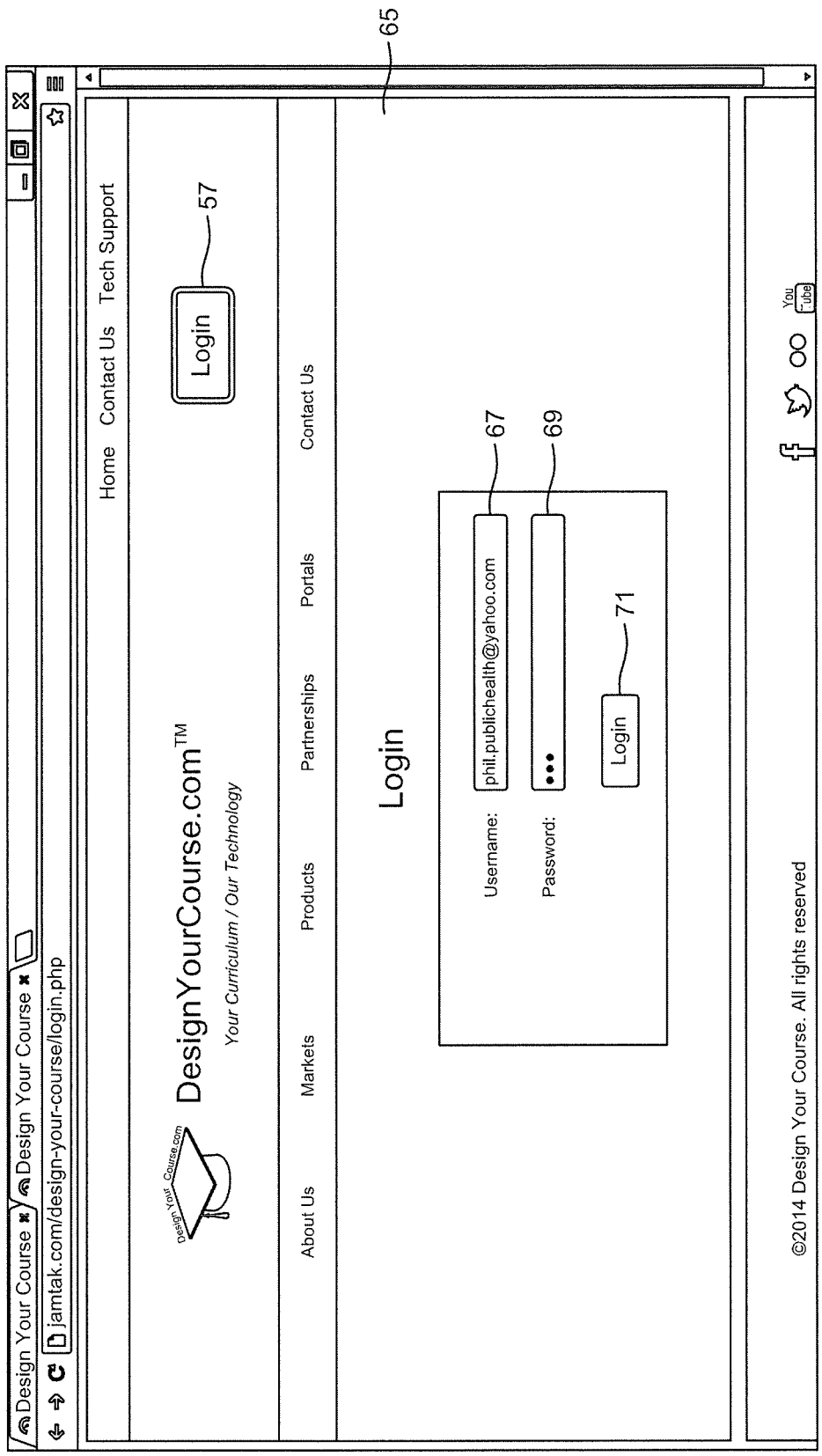
FIG. 4 is a representation of a login page in an embodiment of the course development software application of the present invention.
Figure 5:
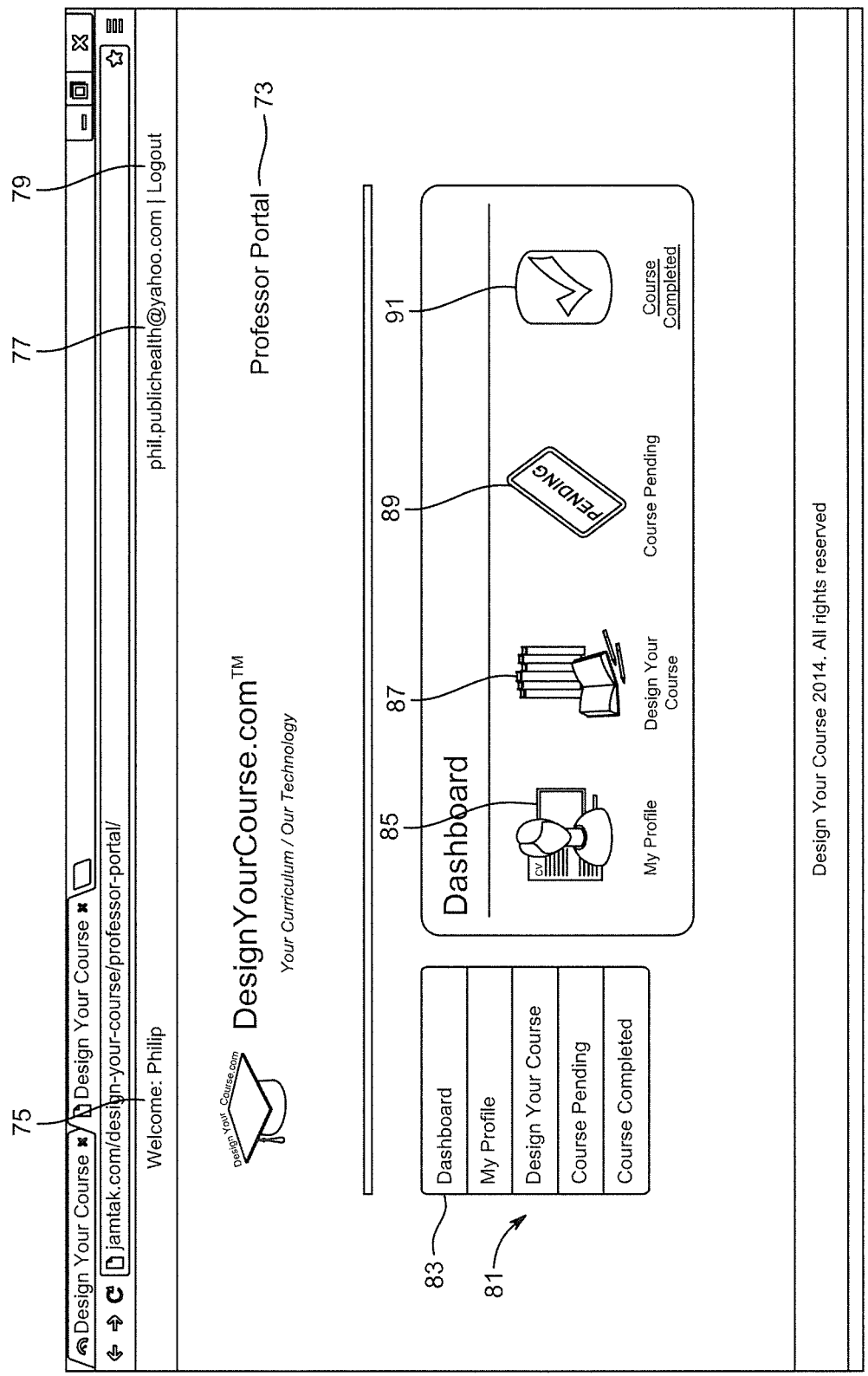
FIG. 5 is a representation of a dashboard in an embodiment of the course development software application of the present invention.

By entering the appropriate domain name 42 of the virtual server 18, a home page 41 as shown in FIG. 3 provides options for a user. The DesignYourCourse.com™ home page 41 in an embodiment of the course development software application 10 may provide a title 43 and logo 45 with information about the software and company as the administrator of the course development software application 10 in an about us page 47. Additional pages may have information on available markets 49 related to educational subjects, grade levels, educational organizations, government agencies, and/or career training centers that may use the course development software application. Other pages may provide information on available software products 51, partnerships 53 with educational organizations or others, and software portals 55 to access other features. To access the course development software application 10, the user must first select the login button 57 which opens a login page 65 that has a data input options for the user to enter their login name 67 and password 69, as shown in FIG. 4. The user must then select the login button 71 and if the appropriate user login information has been entered, the home page is displayed again and the DesignYourCourse™ button 59, the Design Your Textbook button 61, and Design Your Syllabus button 63 will be active for the authorized user. The user may then select the Design Your Course button 59 to access the course development Professor Portal page 73 as shown in FIG. 5. The Professor Portal page 73 gives the professors name 75, email 77 and the option to logout 79. The Professor Portal page 73 also provides an easily accessible menu 81 that provides access to features of the software 10. The Dashboard 83 provides menu options as colorful icons and allows the user to access particular features such as work in progress so the user can easily return to a course they were developing. In an embodiment of the course development software application 10, these features are My Profile 85, Design Your Course 87, Course Pending 89, and Course Completed 91. Each of these features may be accessible through the Dashboard 83 icons or through the menu 81.

Figure 6:
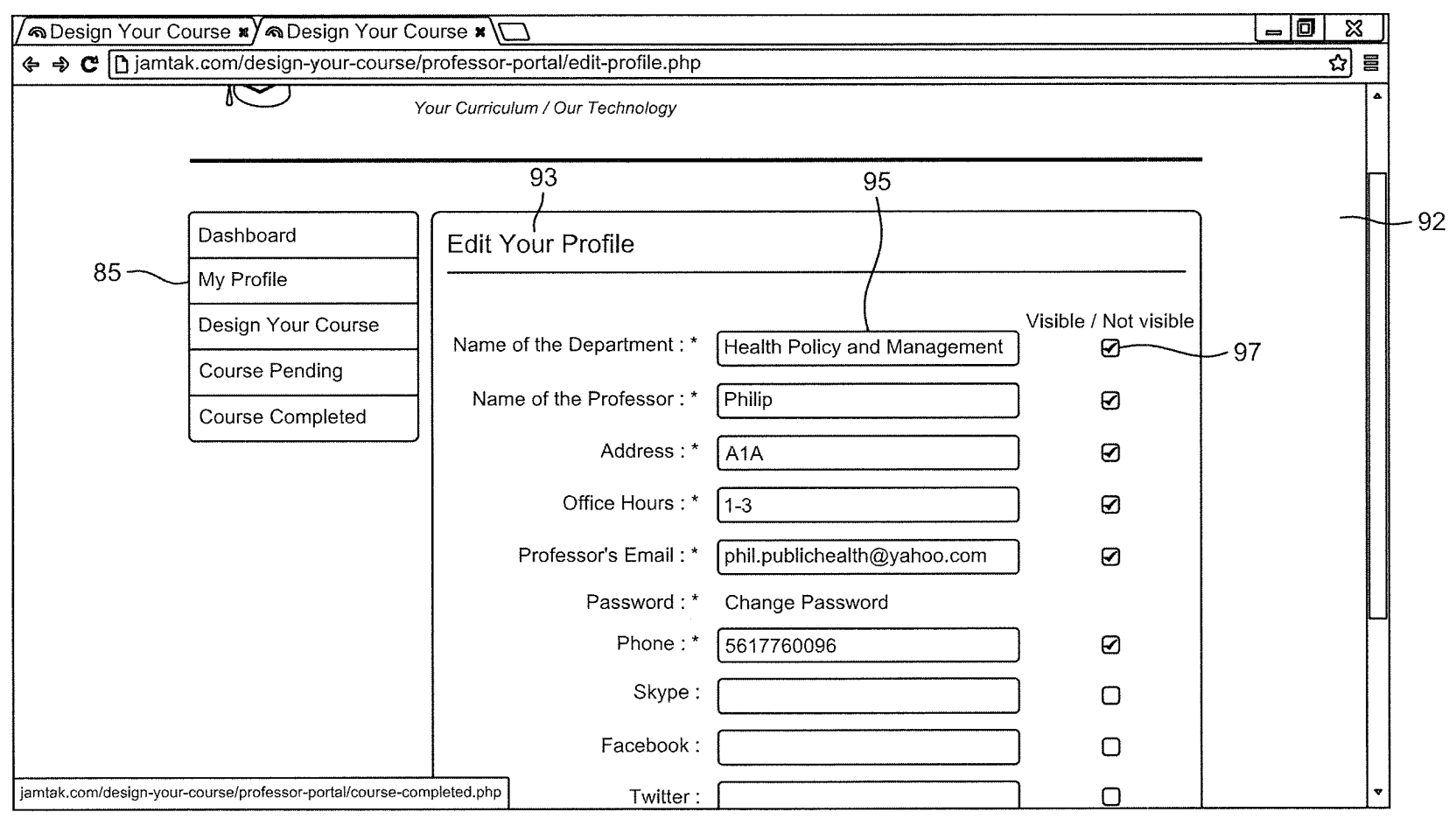

The My Profile 85 option opens the user's profile page 92 as shown in FIG. 6 and offers an Edit Your Profile 93 feature that allows the user to enter information 95 such as name, address, email, telephone numbers, and other information such as social media account information that may be used to access or display courses developed by the user. A display option 97 provides for any selected profile information to be visible in the pages of the course development software application 10 and unselected information to be hidden as desired.

Figure 7:
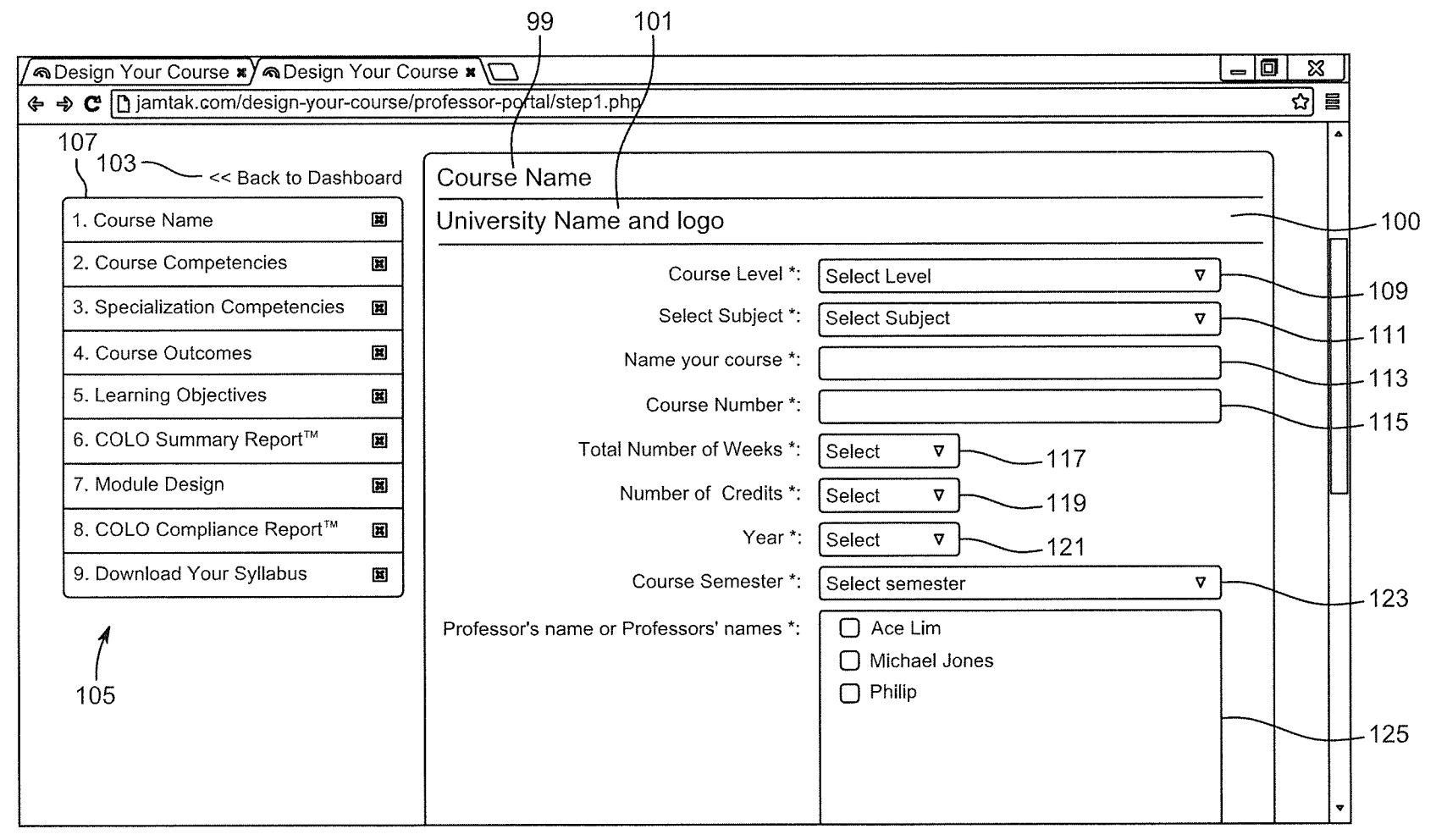
Figure 8:
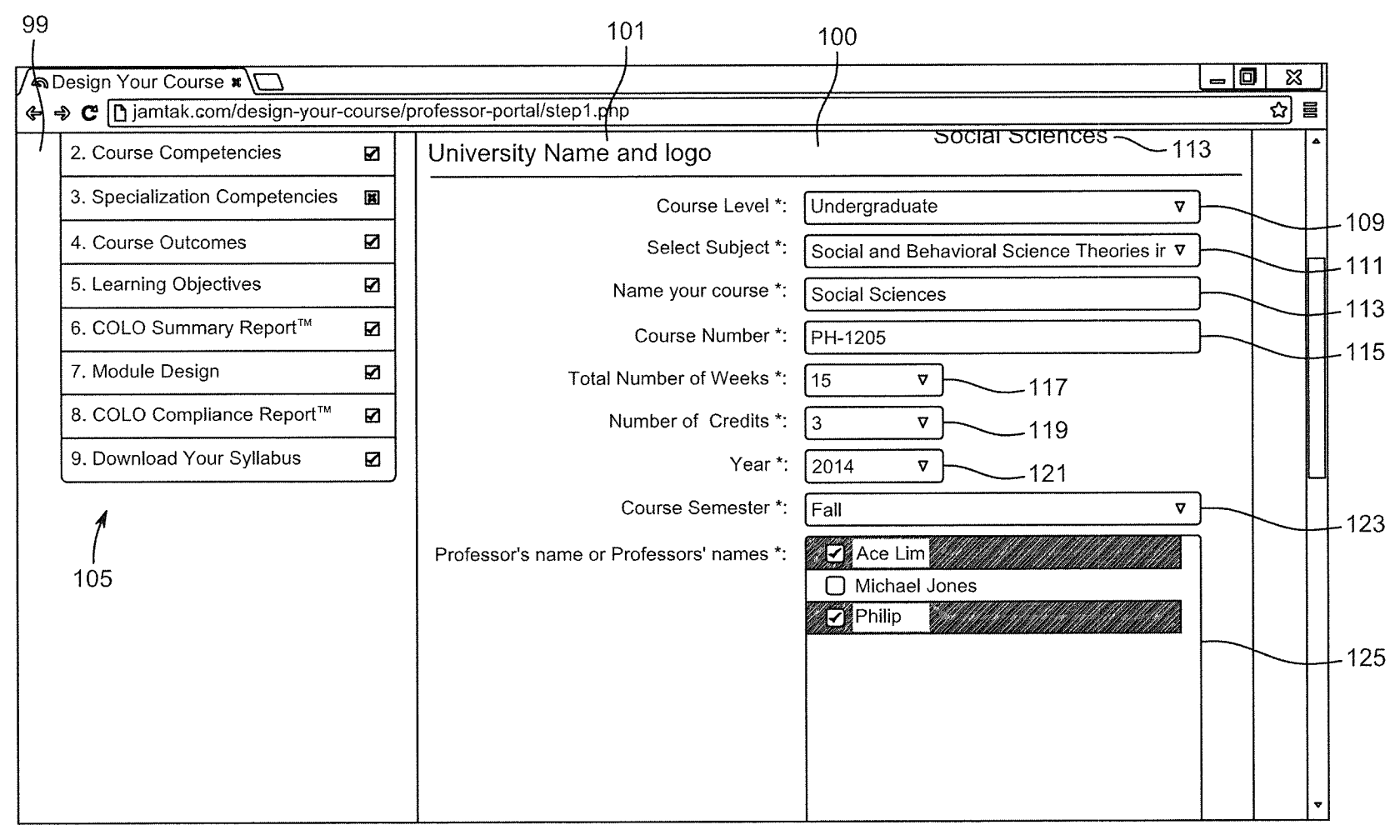
Figure 9:
FIG. 9 is a representation of a course information module showing class times in an embodiment of the course development software application of the present invention.
Figure 10:
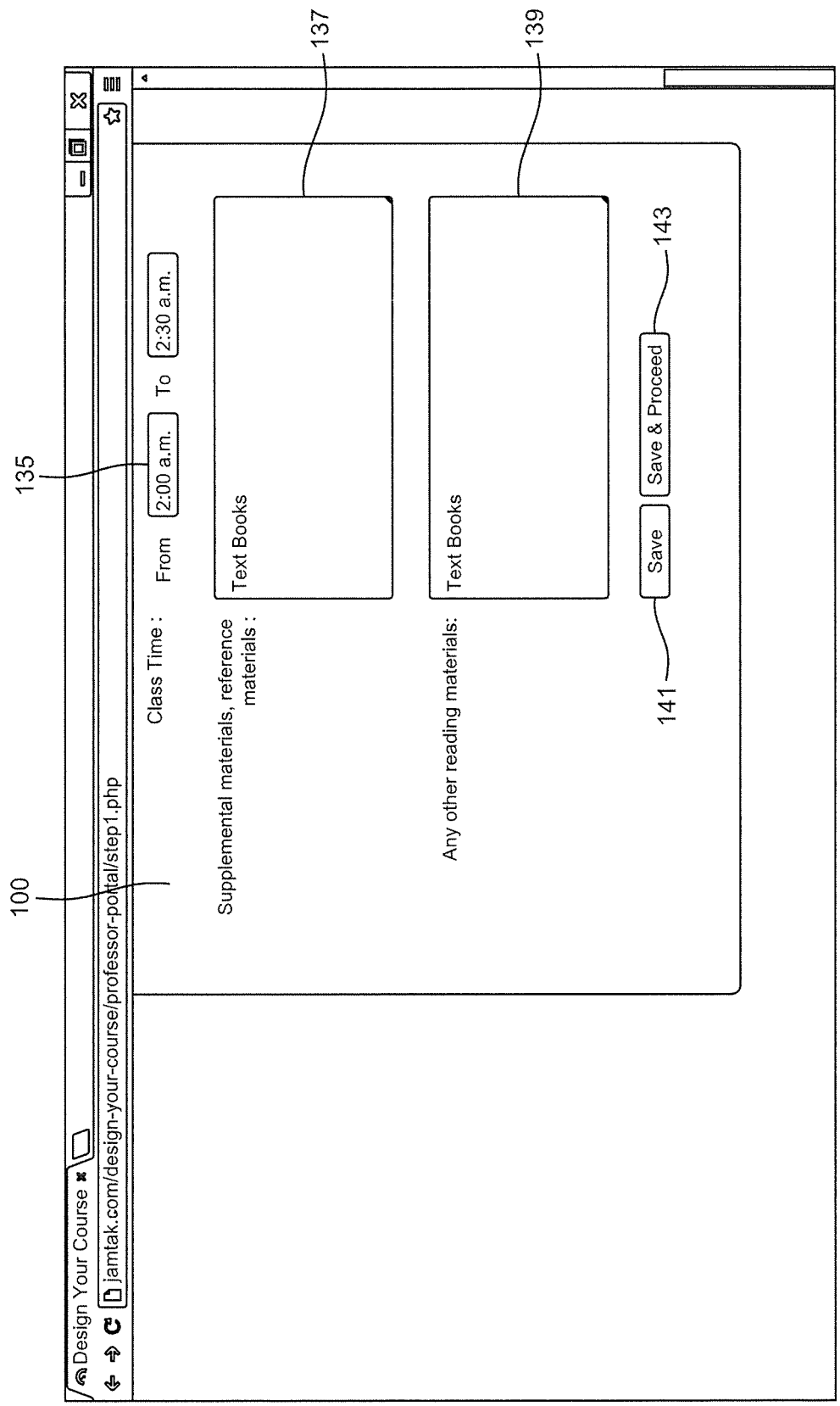
FIG. 10 is a representation of a course information module showing course materials in an embodiment of the course development software application of the present invention.
Figure 11:
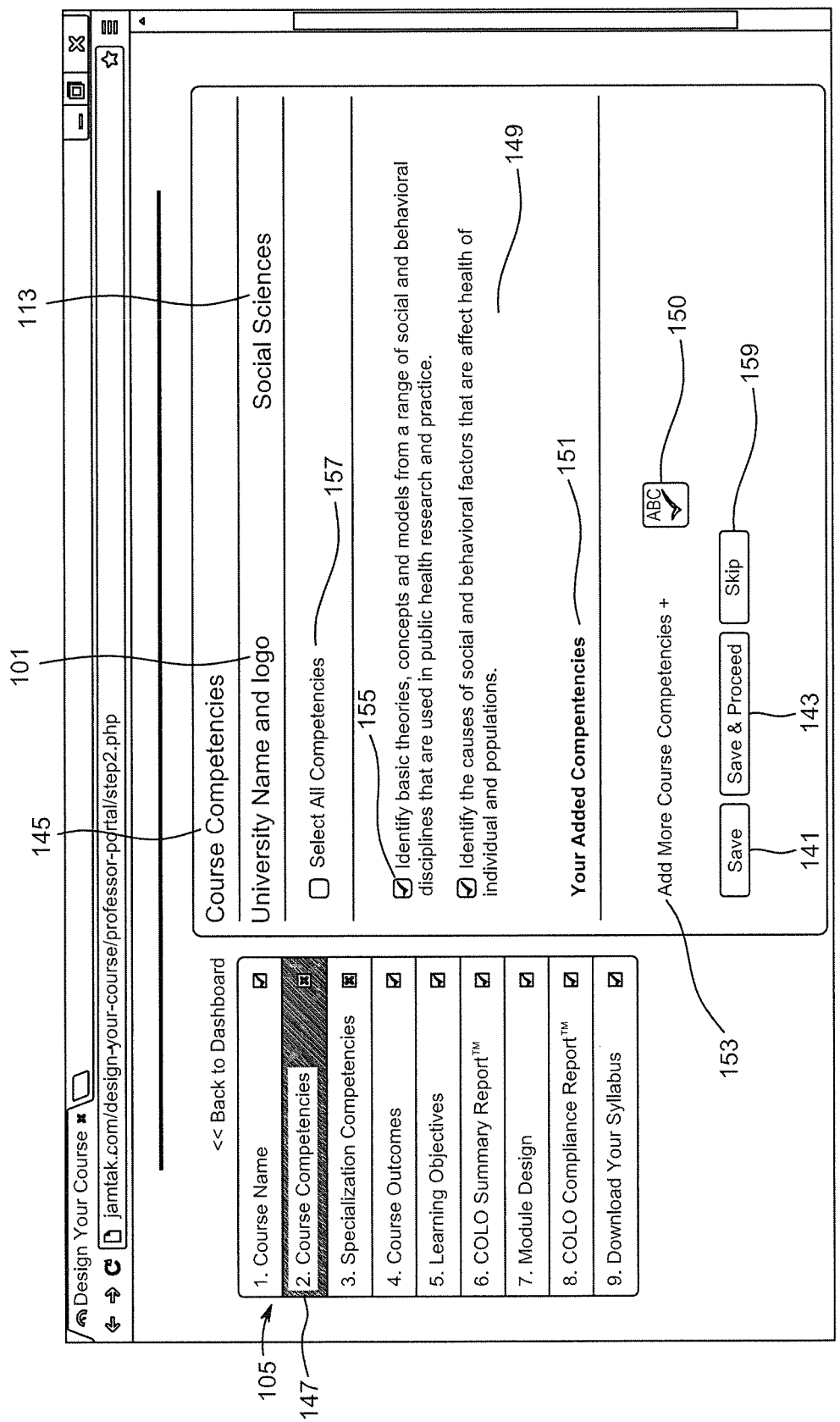
FIG. 11 is a representation of a course competencies module in an embodiment of the course development software application of the present invention.

By selecting the Design Your Course 87 option from the Dashboard 83 or menu 81, the Course Information Module 100 may be displayed as shown in FIG. 7. The Course Information Module 100 has the Course Name 99 that is displayed with the University name and logo 101 on each page through the course development process. An option to return Back to Dashboard 103 may also be provided. The Design Your Course menu 105 presented on the Course Information Module 100 and other pages provides a step by step process for the educator 31 or other user to step through and create or review and edit a course. The Course Information Module 100 allows a user to enter the course level 109, the subject 111, the course name 113 and course number 115. Some or all of this information may then be presented on subsequent course development pages to identify the course being developed. The Course Information Module 100 also provides the user the option to enter when and for how long the course will be presented providing for the total number of weeks 117, the number of credits 119, the year 121 and the semester 123 to be entered. One or more professors 125 may be selected as shown in FIG. 8 to provide information on who will be teaching the course. The textbook dialog box 127, as shown in FIG. 9, provides for the educator 31 to enter textbooks for the course. The location 129 may be selected as either a web accessible course or the location at the educational institution 24 with a classroom dialog box 131 to enter the specific room and building where the course will be offered. The days of the week 133 and time period 135 for the course may also be entered. A supplemental course materials dialog box 137 and Any Other Reading Materials 139, as shown in FIG. 10, provides for materials such as videos, articles and other reference material that will be needed for the course. The information in the Course Information Module 100 may be saved by selecting the Save button 141 for the user to exit the course development software application 10 or by selecting the Save and Proceed button 143 that allows the user to move to the next step which opens the Course Competencies Module 145, as shown in FIG. 11. In the step by step process for course development, the Course Competencies menu option 147 may be listed first and most often be the best choice for the educator 31 to begin with.

For example, for the college professor or other educator performing this curriculum development process in the context of his own research and teaching duties and the requirement to meet the strict accreditation standards requested of each educational institution, a clear understanding of the course competencies required is critical. While in some cases the professor may use their own competencies, most often the institutional administrator, department chairs and deans may determine these requirements, so these may be initially entered by the course development software application administrator 30 and may then be provided in a Course Competencies list 149 within the Course Competencies Module 145. The Module 145 also provides for additional competencies to be entered within the Your Added Competencies section 151 that allows the college professor or other course developer to add additional competencies by selecting the Add More Course Competencies option 153. In this way the educator 31 may provide specific competencies related to the course material and requirements and review these separately or in tandem with the competencies from the institutional requirements. From the Course Competencies list 149 any number of competencies that are related to the course may be selected and the same or variations of the same competencies may be listed for more than one course. For example, courses that include lab work, may have competencies related to the practical application of the course material which may be different from a similar course that does not have lab work. The required competencies for the course are chosen by selecting a check box 155 in the Course Competencies list 149, by selecting a check box 150 in the Your Added Competencies section 151 or by selecting the Select All Competencies check box 157 to have all competencies included with the course. Once data entry into the Course Competencies Module 145 is completed, the user may select the Save button 141 and exit, the Save and Proceed 143 to continue or the Skip button 159 if no additional information has been added to the Module 145.

Figure 12:
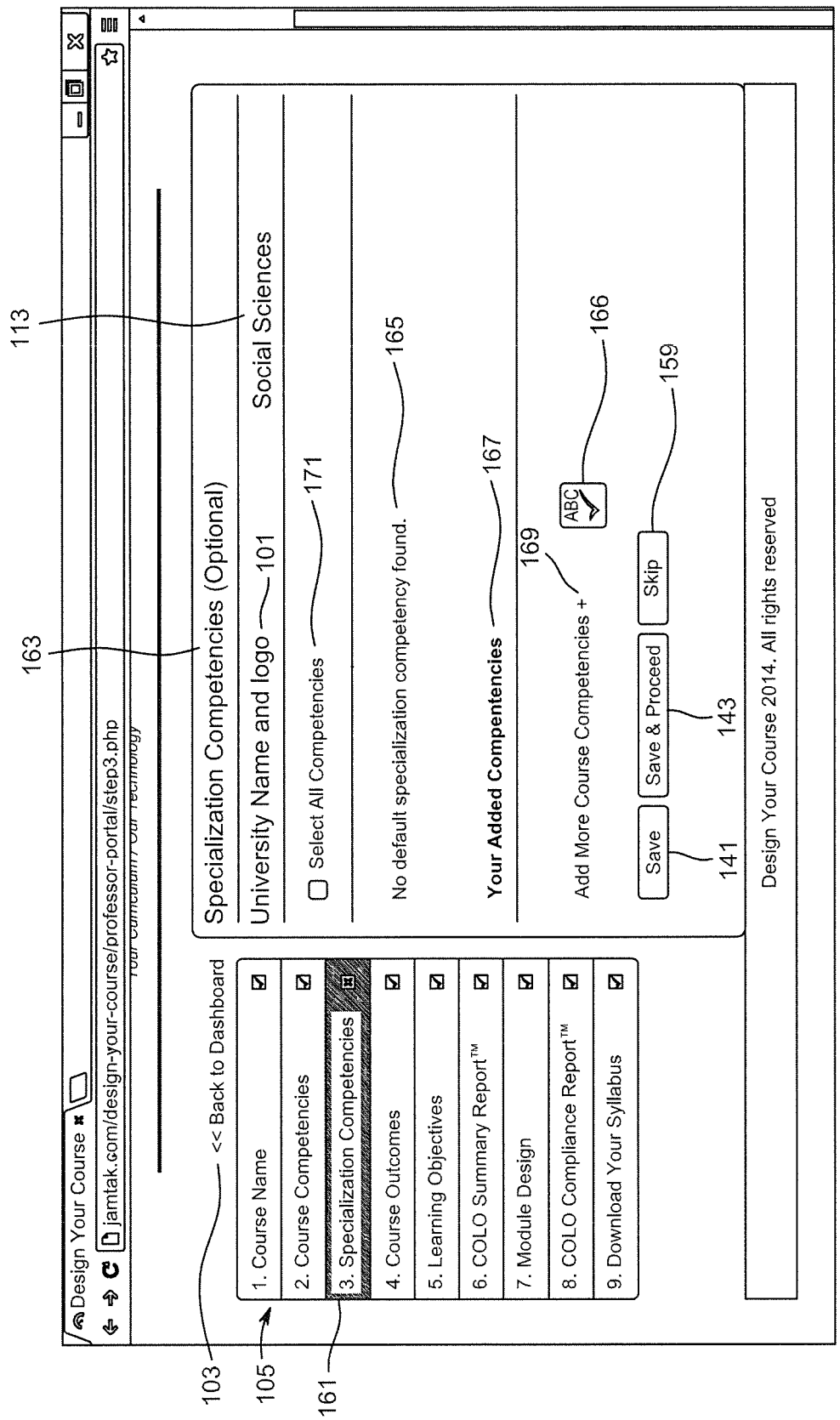
FIG. 12 is a representation of a course specialization competencies module in an embodiment of the course development software application of the present invention.

The next option from the menu 105 may be the selection of the Specialization Competencies menu option 161 that opens the Specialization Competencies Module 163 shown in FIG. 12. Similarly to the Course Competencies Module 145 options are provided to add unique specialization competencies that are associated with the course content, the subject, the department, the institution or other requirements that may be more specific than the general course competencies. In this example, the Specialization Competencies list 165 does not have any competencies listed, but the options are provided for the professor to add to this list using the Your Added Specialization Competencies section 167 and selecting the Add More Specialization Competencies option 169. The check box 166 and other check boxes to include any number of the specialization competencies will be provided or the Select All Competencies check box 171 may be selected to add all specialization competencies.

Figure 13:
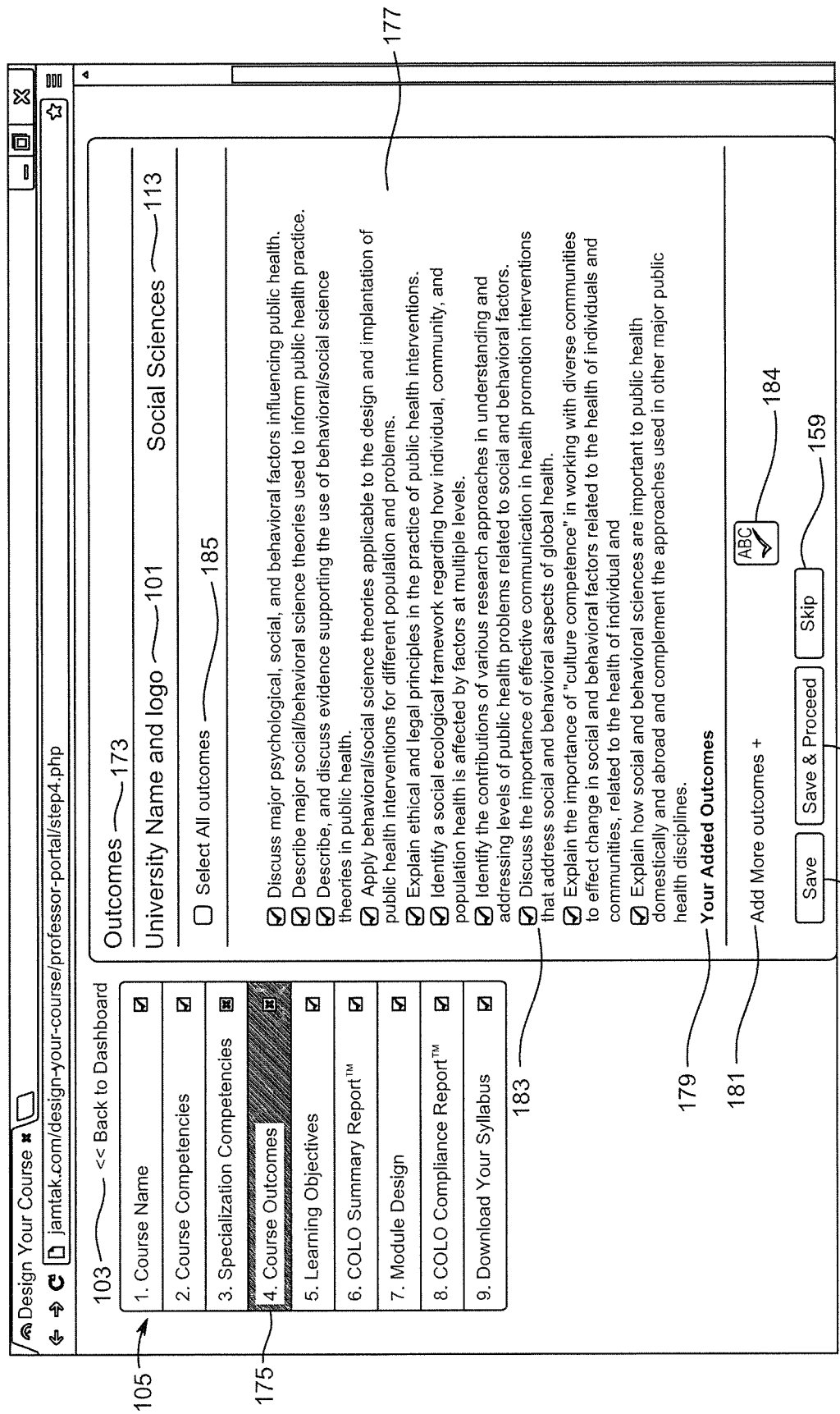
FIG. 13 is a representation of a course outcomes module in an embodiment of the course development software application of the present invention.

The Course Outcomes Module 173 may be accessed using the Course Outcomes menu option 175, as shown in FIG. 13. The course development software application administrator 30 may initially enter course outcomes to populate an initial Course Outcome list 177, however the professor or other course developer may be responsible for entering additional data into the Course Outcomes Module 173 based on the course material and assignment requirements of the course. The additional course outcomes are added to the Your Added Outcomes section 179 by selecting the Add More Outcomes option 181. Check boxes 183 in the Course Outcome list 177 and a check box 184 for the added course outcomes allow the professor to select which outcomes will be included with the course or to opt for the Select All Outcomes 185 to have all outcomes included.

Figure 14:
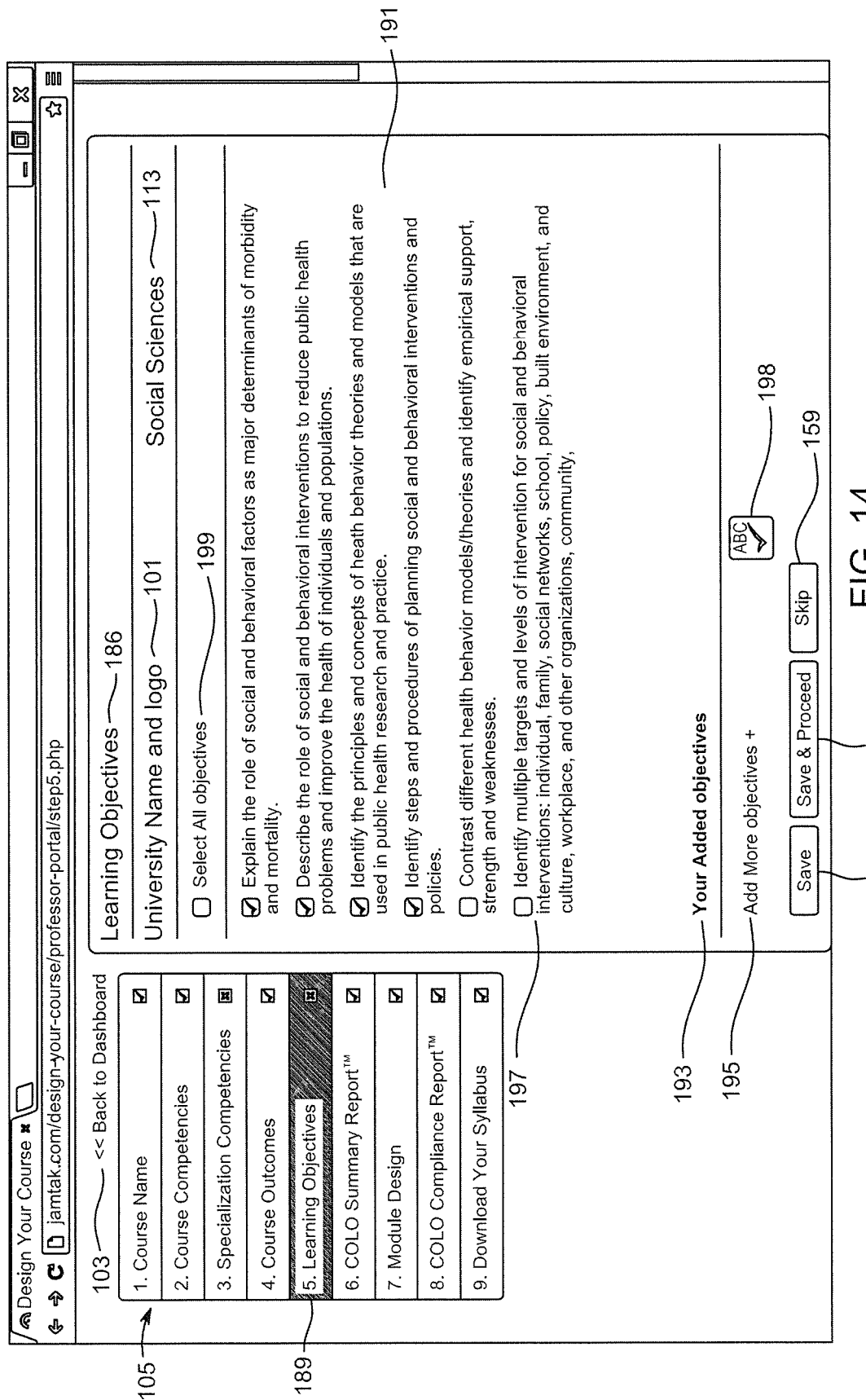
FIG. 14 is a representation of a course learning objectives module in an embodiment of the course development software application of the present invention.

Similarly, the Learning Objectives Module 187 may be accessed using the Learning Objectives menu option 189, as shown in FIG. 14. With initial learning objectives provided in the Learning Objectives list 191 that may have been entered by the course development software application administrator 30. The professor or other course developer may add learning objectives in the Your Added Objectives section 193 based on the course material and assignment requirements of the course. The additional learning objectives are added by selecting the Add More Objectives option 195. Check boxes 197 in the Learning Objectives list 191 and a check box 198 for the added course objectives allow the professor to select any number of objectives or select the Select All Objectives 199 to have all learning objectives included.

The core and specialization course competencies, outcomes and learning objectives may all be entered by and according to the educational institutions requirements. In order to assist with these requirements, the course development software application 10 provides an inventory of requirements for a wide variety of courses in a multitude of subjects. These requirements may be compiled and continually updated from requirements entered by users that may be administrators, or educators, without any identifying information as to the educational institution or user that is the source of the requirement. In this manner, competencies within subject areas from different government agencies, educational institutions, training facilities and/or other educational organizations may be accessed and be used by an educator to structure course material to meet these required competencies without rewriting or reentering the competency requirements. At any time the course developer may save their work entered and leave the course development software application 10. The user may then reenter sections using the Design Your Course menu 105 or enter a particular section for editing for example to add or change course materials using the Design Your Textbook button 61 or to change times or dates for presentation of the course using the Design Your Syllabus button 63 from the home page 41. All of the information throughout the development process is securely retained in the virtual server database for automatic retrieval as the development process continues. The Dashboard 83 provides the Course Pending option 89 that provides for a course developer to re-open the course development software application 10 at the same step in the process that was left previously, making it easy to keep track of what steps have been completed and what steps require further information.

Figure 15:
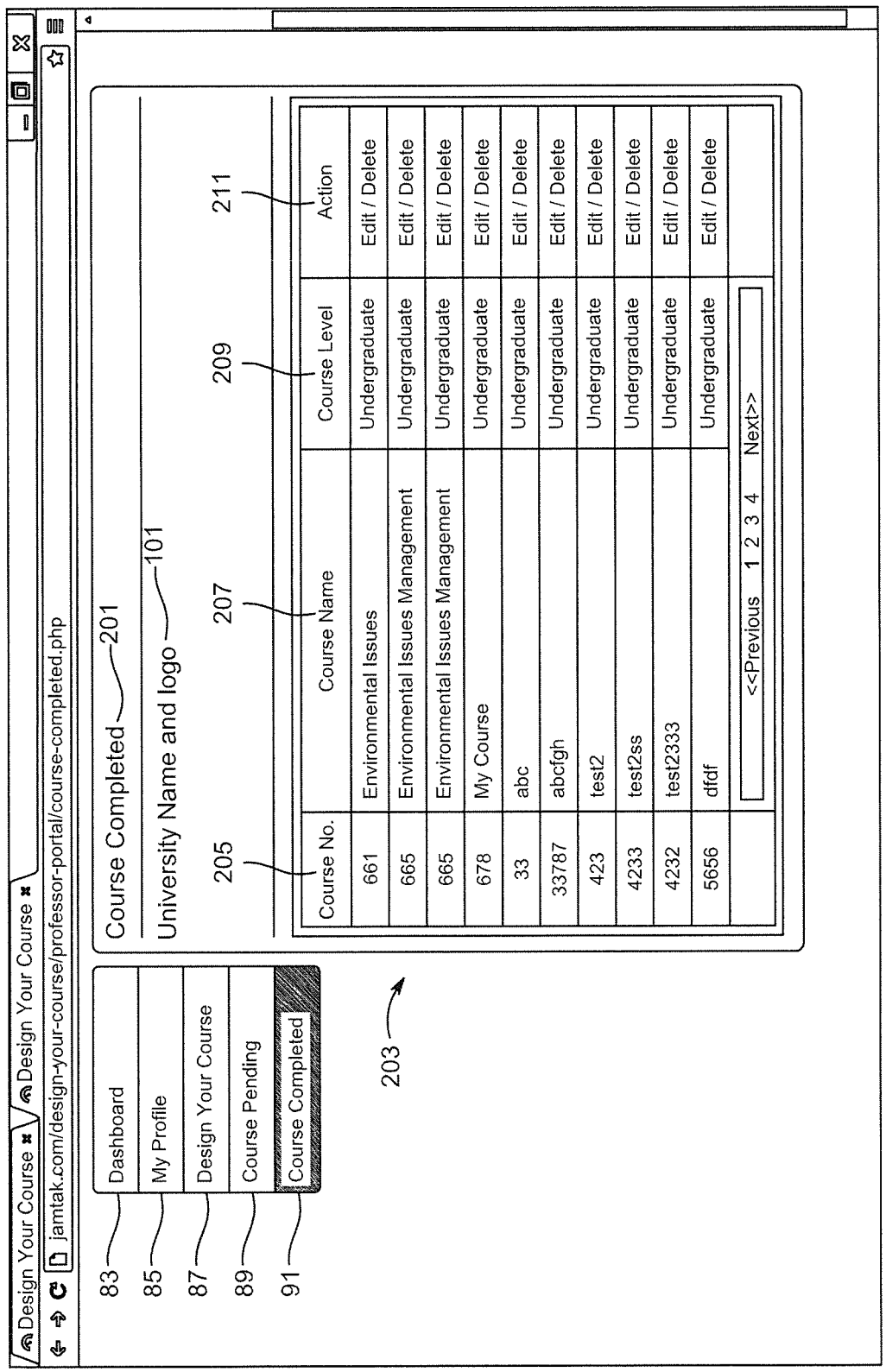
FIG. 15 is a representation of a course completion page in an embodiment of the course development software application of the present invention.

After entering all of the information necessary including the competencies, outcomes and learning objectives, the Course Completion Summary 201 may also be accessed through the Dashboard 83 or menu 81. The Course Completion Summary 201, as shown in FIG. 15, provides a Course list 203 that includes the Course Number 205, the Course Name 207, the Course Level 209, and an Action option 211 that allows a user to enter the course information to edit the information further or to delete the course from the Course list 203. The user as the college professor developing the course or as an educational institution administrator may select any course from the Course Completion Summary 201 to open the course and access the menu 105 options for review and approval.

Figure 16:
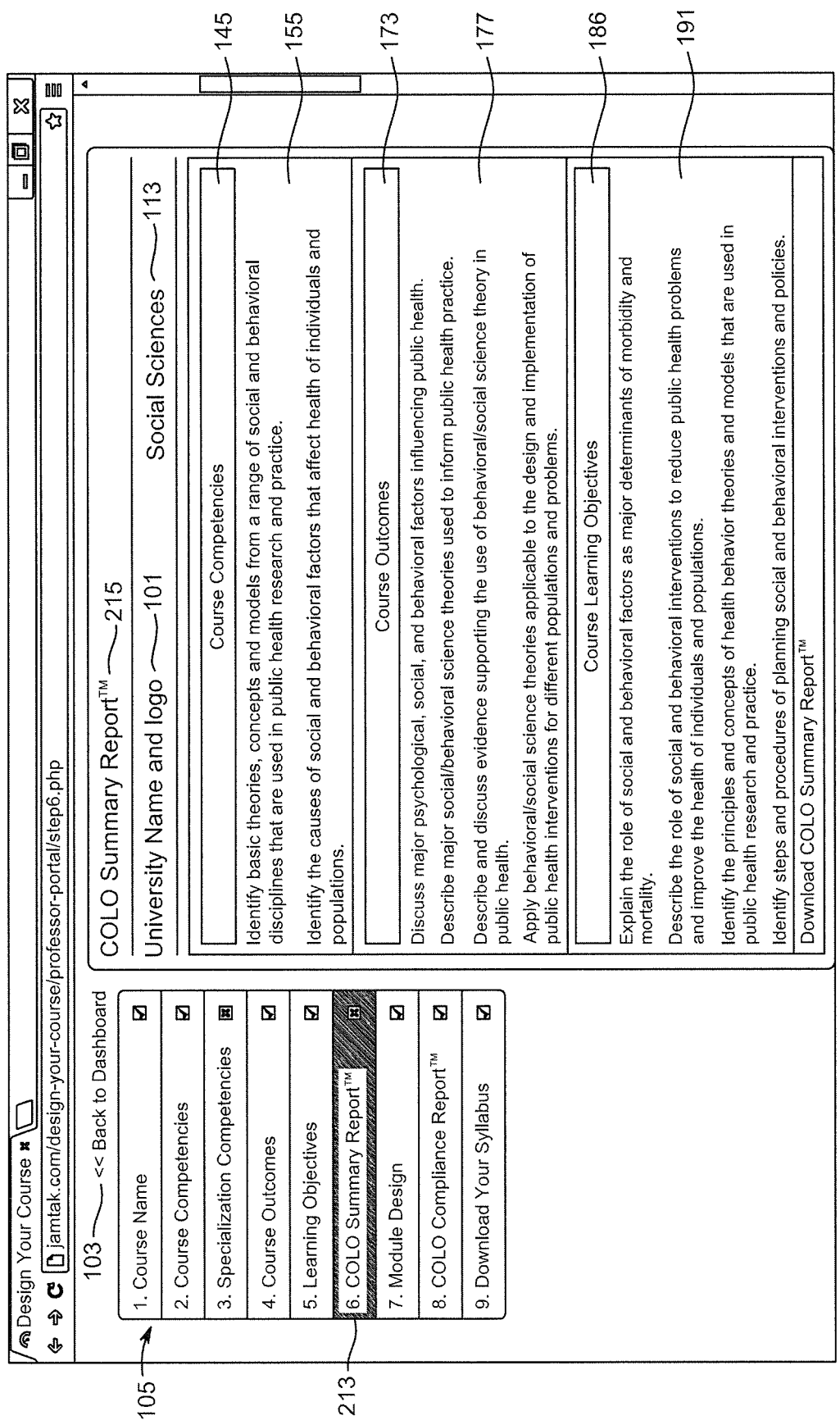
FIG. 16 is a representation of an embodiment of a COLO Summary Report™ Module in an embodiment of the course development software application of the present invention.

From the menu 105, the user may select the COLO Summary Report™ menu option 213 to open the COLO Summary Report™ Module 215, as shown in FIG. 16 that develops and presents all of the entered course information in a unique summary report that shows the alignment of the course information with the core and specialized course competencies, course outcomes and course learning objectives and provides an easy method of review of the course information. Any number of course objectives and other course requirements may be included in the COLO Summary Report™ as shown in FIG. 17. When satisfied, the college professor or other users may use the software application tools of the COLO Summary Report™ Module 215 to download the COLO Summary Report™ in Microsoft Word (.doc), Microsoft Excel (.xls), Adobe Portable Document Format (.pdf), Hyper Text Mark Up (HTML) and other file formats that can be used in the course approval and in the educational institution's accreditation process.

Figure 18:
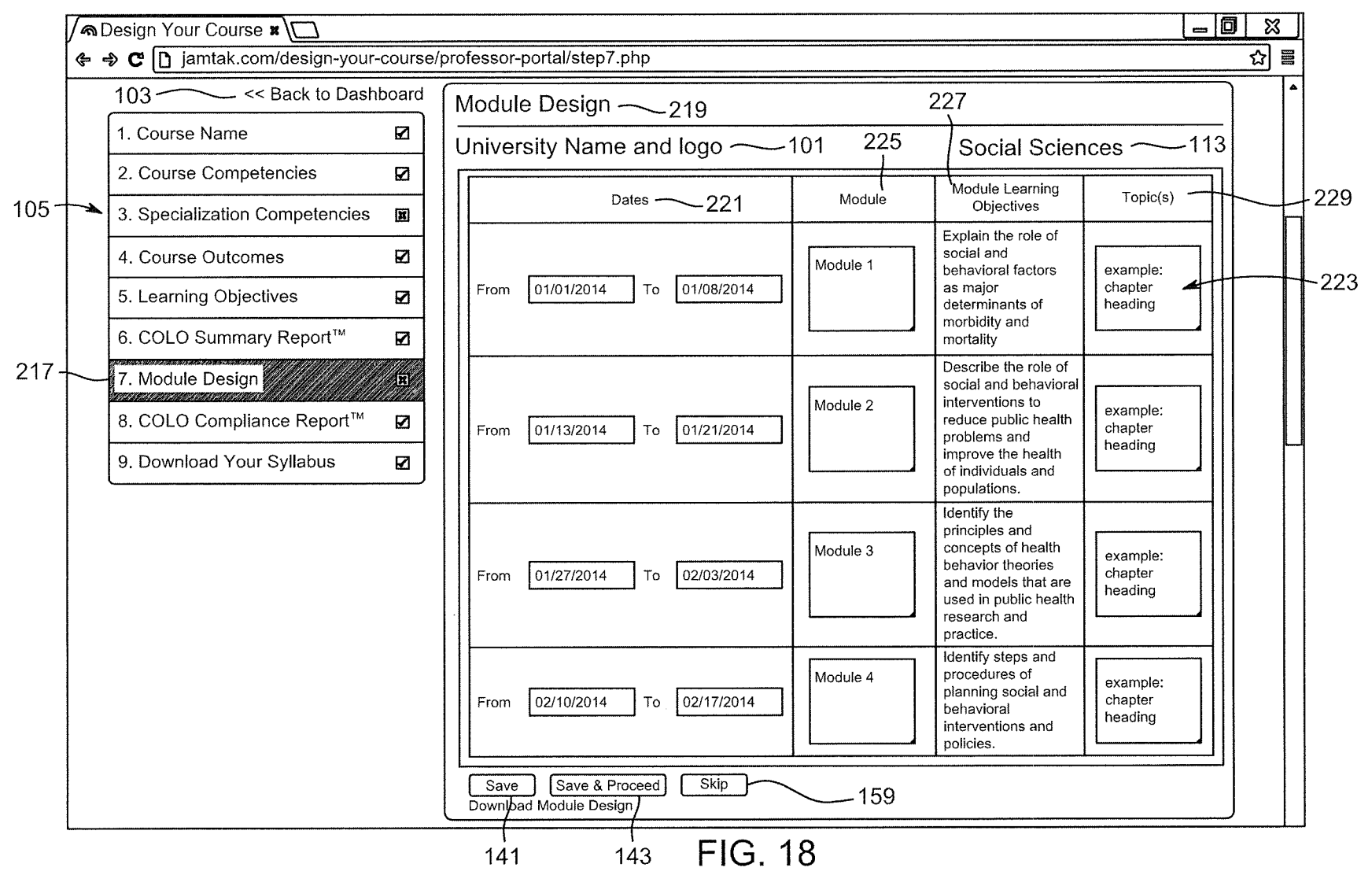

The college professor may then access an important feature of the course development software application 10 that greatly simplifies the transformation of the course information into a course syllabus. The user selects the Module Design menu option 217 to open the Module Design interface 219 for the course, as shown in FIG. 18. This easy to use feature presents a modular schedule that may be for each day of class or for one or more days as required to complete each section and assignment of the course. The course information is presented in a spreadsheet type format that lists the class day and/or dates in each row in a Dates column 221. The day and/or dates in each row are aligned with a Class Module 223 that is numbered with each Module number listed in the Module column 225. Each Class Module 223 is associated with the learning objectives that may be specific to the Class Module 223 or to a group of related Class Modules 223. These learning objectives are listed in the Module Learning Objectives column 227. Also associated with the class Module 223 is the planned topic, content and activity for each Class Module 223. With the learning objectives aligned with the course competencies and outcomes and displayed with each Class Module 223, the course developer must simply enter the course content, topics and activities in the Topics column 229 for each Class Module 223 and save the Module Design interface 219 for the course. Reading assignments, lectures, presentations, required reports, tests and all other course content can be entered on a day by day or class module by class module basis that can be easily modified. Once the content information is entered the Module Design interface 219 is saved. The college professor or course developer may then adjust the order of Class Modules 223 by dragging and dropping them into place to maintain alignment of the competencies, outcomes and learning objectives with the class day topic, content, activity and place the Class Module 223 in any order suitable for the class schedule, availability of the professors, and the structure of class assignments. The requirements may also be placed in any order and be moved separate from content and/or date and time information with a simple mouse click by the user. In this very intuitive way, a simple mouse click by the college professor, administrator, or other user retains the alignment of competencies with learning objectives intact throughout the process of developing a syllabus with appropriate topics and content for the scheduled classes. There is no need for the user to cut and paste into subsequent course developments documents, or to have high level computer skills to format tables, or to structure document text properly to have the course information aligned with the required competencies. The display of the competencies, outcomes and learning objectives within this contextual timeframe of the Module Design interface 219 also provides for an institutional administrator or other users to easily verify that course content overlaps and adheres to these requirements and that the topics align with the class schedule for the course.

When satisfied, the college professor can select the COLO Compliance Report™ menu option 231 to open the COLO Summary Report™ Module 233 that provides COLO Compliance Report™ for review, as shown in FIG. 19. The COLO Compliance Report™ 233 integrates all of the information from the Course Information Module 100, the Course Competencies Module 145, the Specialization Competencies Module 163, the Course Outcomes Module 173, and the Learning Objectives Module 187 with the Module Design interface 219 information that includes the course topics, content and activities. The COLO Compliance Report™ includes the necessary information for an auditor to review the course for adherence to competencies and approve the educational institute for accreditation. Using the software application tools of the COLO Summary Report™ Module 233, the COLO Compliance Report™ is easily generated in various file formats such as .doc, .pdf, .xls and others including HTML. There is currently no comparable methodology and apparatus that is accessible to educators that can develop, compile and present course information in a way that is as easy to use and review thereby greatly simplifying a very complicated process.

Figure 20:
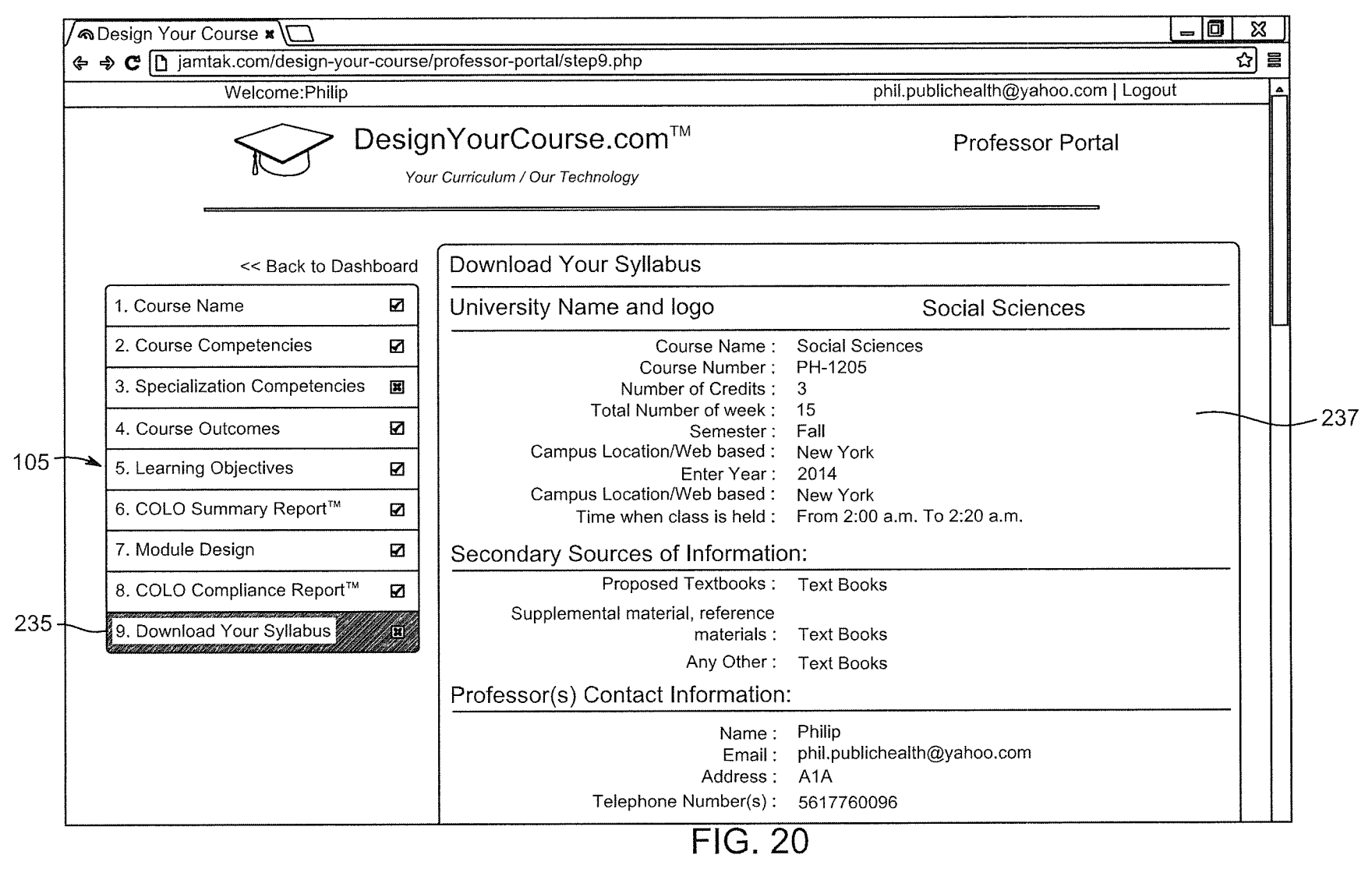

The course development software application 10 further provides for the college professor or other course developer to select the Download Your Syllabus menu option 235 to display the compiled Course Syllabus 237 from the Course Information Module 100 and Module Design interface 223, as shown in FIG. 20. The Course Syllabus 237 may be produced in any file format such as .doc, .pdf, .xls and others including HTML which provides for the course development software application 10 to easily integrate the Course Syllabus 237 with any educational institution's learning management system platform 34 with features of the course development software application 10 providing for the purchase of textbooks, the downloading of reading materials, the access to lectures, presentations and videos and other access points that support an integrated educational system solution that aligns competencies with the desired student outcomes and learning objectives.

While the foregoing is directed to embodiments of the present invention, other and further embodiments of the invention may be devised without departing from the basic scope thereof. For example, although embodiments having various features have been described herein, combinations of such various features in other combinations not discussed herein are contemplated within the scope of embodiments of the present invention.

What is claimed is:

1. A method for the processing of competency requirements for the development of competency based educational courses, comprising:
   using a central processing unit (CPU) connected via a network to a remote storage device to access a plurality of competency requirements stored in the remote storage device;
   annotating each of the plurality of competency requirements as within one or more course subjects;
   accessing an educational institution's course subjects;
   accessing an educational institution's accreditation standards;
   annotating each of the plurality of competency requirements as within one or more of the educational institution's accreditation standards;
   storing the competency requirements annotated as within one or more of the course subjects and within the accreditation standards of the educational institution within memory;
   implementing a course development software application on a computer system, the computer system having computer hardware, system memory, at least one database, and data storage and communications interfaces that facilitate the transformation of data using the course development software application;
   the course development software application comprising:
      instructions to enter course information including course subject and course content within a course information module; and
      instructions to access from within a course competencies module, the annotated competency requirements related to the course subject entered within the course information module and to access the educational institution's accreditation standards related to the course information;
   wherein the course information is editable and transportable using a format that provides for a portion of the course content and course competencies to be modified and moved; and
   displaying only annotated competency requirements related to the course subject and the accreditation standards of the educational institution to align the course information with competency requirements to develop competency based educational courses; and
   generating from the displayed annotated competency requirements, specialization competencies, annotated outcomes, and annotated learning objectives and the accreditation standards of the educational institution a comprehensive summary report for accreditation of the course based on the accreditation standards of the educational institution.

2. The method of claim 1, further comprising:
   querying the annotated competency requirements;
   annotating the competency requirements as specialization competencies;
   creating an inventory of specialization competencies;
   displaying specialization competencies related to the course subject and course content.

3. The method of claim 1, further comprising:
   creating an inventory of outcomes from course content;
   querying the annotated competency requirements;
   annotating the outcomes within the inventory as aligned with one of the annotated competency requirements;
   displaying only annotated outcomes aligned with the annotated competency
   requirements related to the course subject and course content.

4. The method of claim 1, further comprising:
   creating an inventory of learning objectives from course content;
   annotating the learning objectives within the inventory as aligned with one of the annotated competency requirements;
   displaying only annotated learning objectives aligned with competency requirements related to the course subject and course content.

5. The method of claim 1 further comprising storing in memory inventories of specialization competencies, outcomes and learning objectives for a wide variety of courses in a multitude of subjects.

6. The method of claim 1 further comprising:
   accessing the compliance requirements for accreditation for the educational institution;
   accessing the comprehensive summary report;
   aligning the competency requirements, specialization competencies, annotated outcomes, annotated learning objectives of the comprehensive summary report with the compliance requirements to generate a comprehensive compliance report for accreditation compliance for the educational institution.

7. The method of claim 1 further comprising:
   receiving entered course information including subject and course content;
   generating a course syllabus.

8. The method of claim 7, further comprising integrating the course information and course syllabus within a learning management system of the educational institution.

9. The method of claim 1 further comprising using a web based server computer system for implementation of the course development software application through an internet or local area network connection.

10. The method of claim 9, further comprising generating a unique domain for each implementation of the course development system through the web based server computer system.

* * * * *